Nov. 15, 1955    N. J. THOMPSON    2,724,012
STORAGE BATTERY CASE
Filed June 17, 1954    3 Sheets-Sheet 1
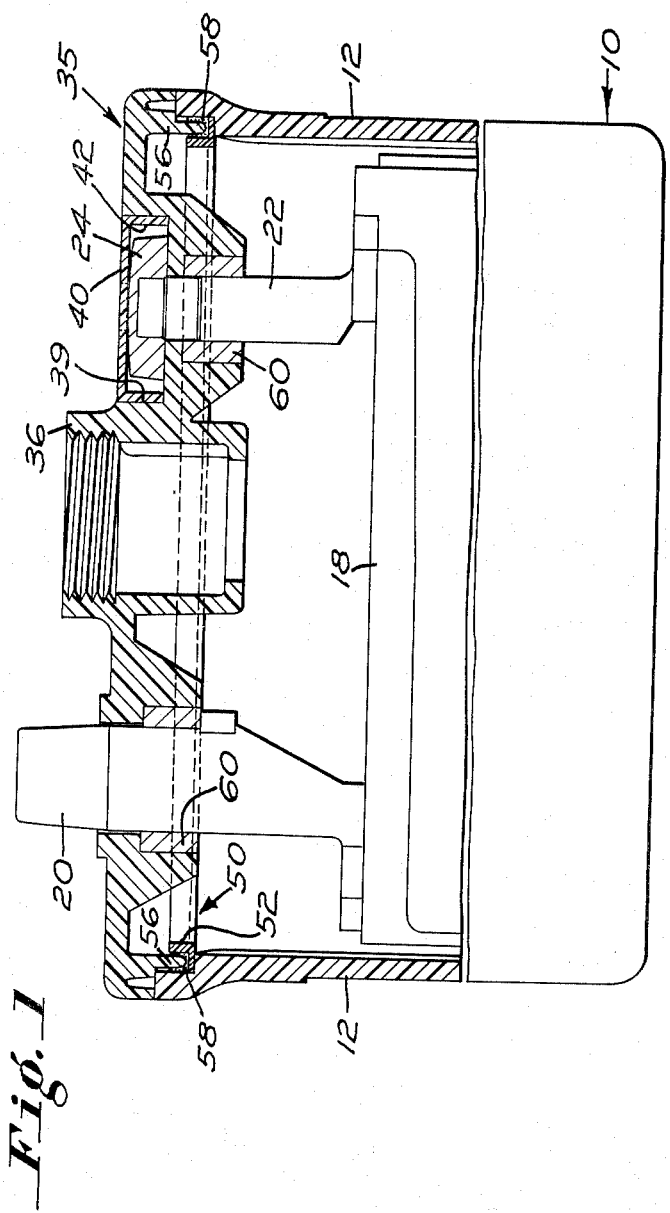
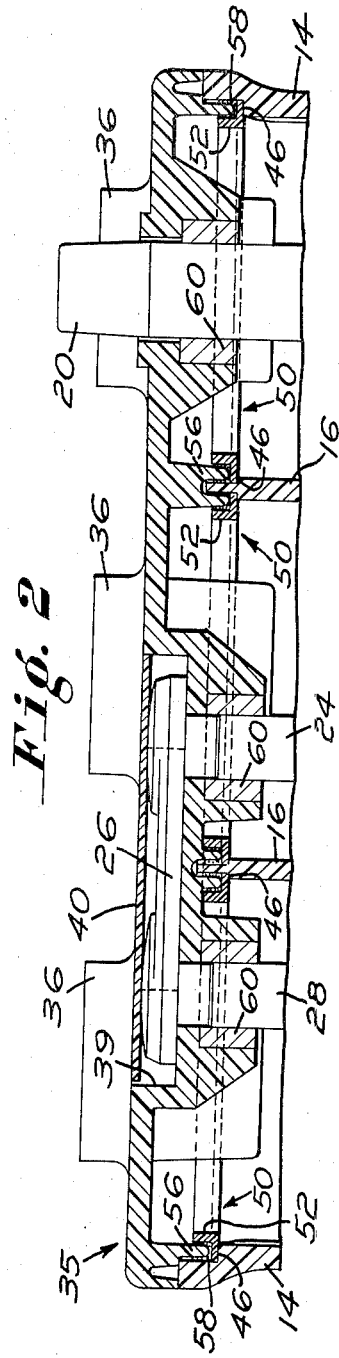
INVENTOR.
NILES J. THOMPSON
BY
Bean, Brooke, Buckley & Bean,
ATTORNEYS.

Nov. 15, 1955
N. J. THOMPSON
2,724,012
STORAGE BATTERY CASE
Filed June 17, 1954
3 Sheets-Sheet 2
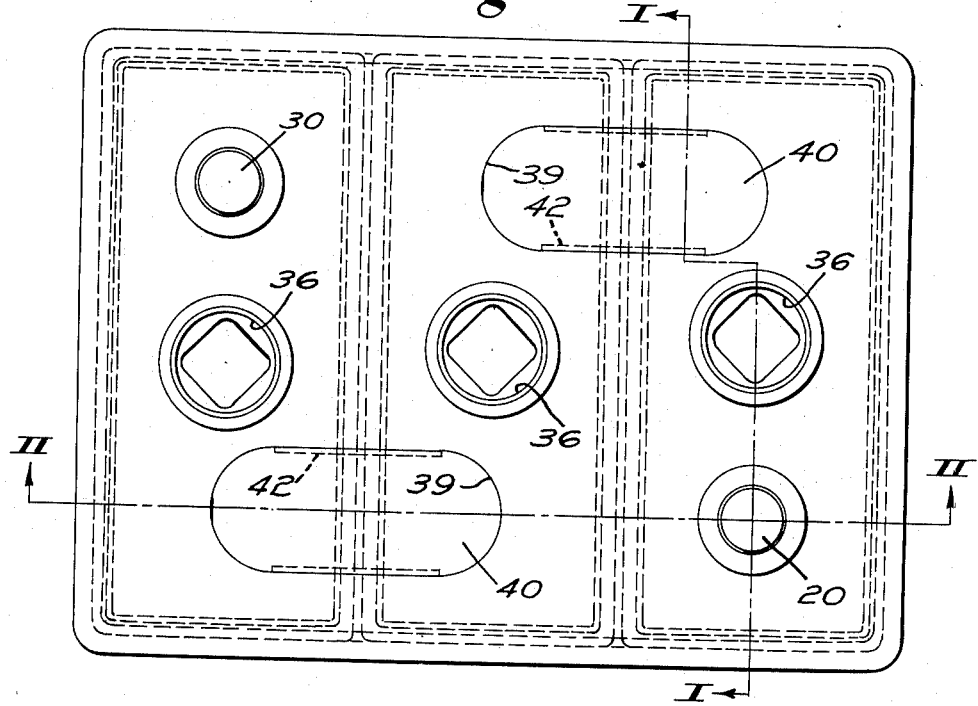
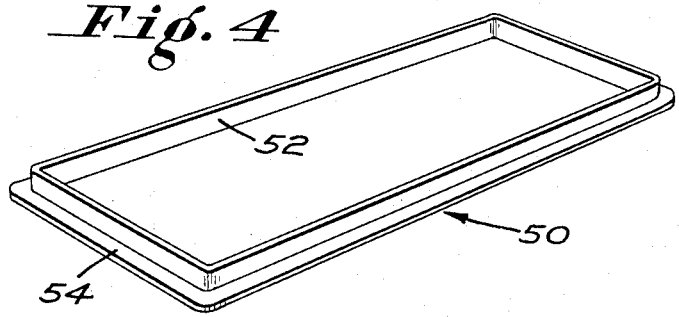
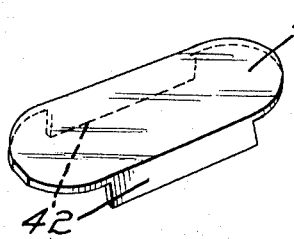
INVENTOR.
NILES J. THOMPSON
BY
Beau, Brooke, Buckley & Beau,
ATTORNEYS.

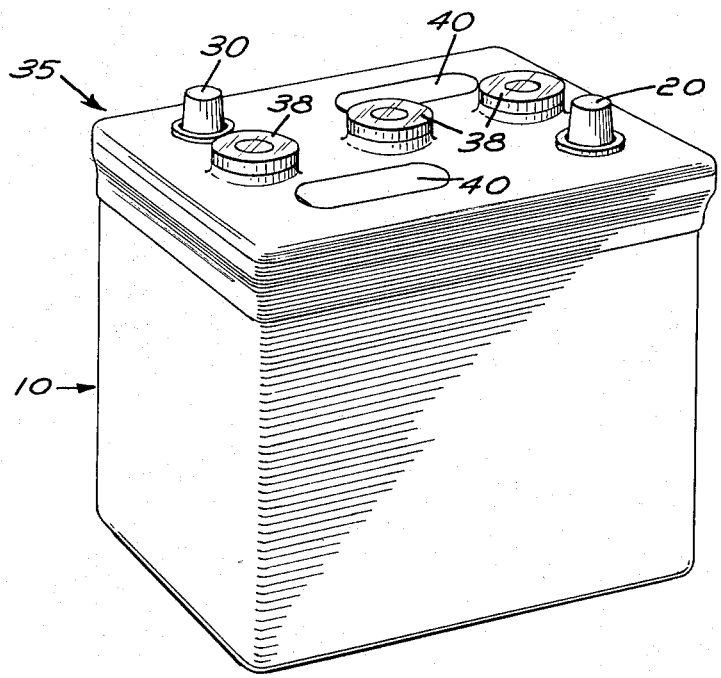

United States Patent Office 2,724,012
Patented Nov. 15, 1955

2,724,012

STORAGE BATTERY CASE

Niles J. Thompson, Williamsville, N. Y., assignor to Gould-National Batteries, Inc., St. Paul, Minn.

Application June 17, 1954, Serial No. 437,335

7 Claims. (Cl. 136—166)

This invention relates to storage battery constructions, and more particularly to improvements in case and cover constructions thereof, and to means for sealing the cover to the case.

One of the objects of the invention is to provide an improved mono-block type case and an improved cover construction therefor, whereby to facilitate factory assembly of such storage batteries.

Another object of the invention is to provide an improved case and cover arrangement as aforesaid whereby such a battery may be factory-assembled while at all times the case is in upright standing attitude, thereby facilitating the battery assembly technique.

Another object of the invention is to provide an improved battery construction as aforesaid wherein the case side walls and the cover member are all of minimum thicknesses, thereby providing maximum electrolyte capacity.

Another object of the invention is to provide an improved battery case and cover construction as aforesaid wherein the components are of maximum design simplicity and facilitate accurate levelling of the cover relative to the case, thereby contributing to the structural simplicity of the battery and reduction of the cost of assembly thereof.

Another object of the invention is to provide a battery case and cover combination as aforesaid which is of improved external appearance.

Other objects and advantages of the invention will appear in the specification hereinafter.

In the drawing:

Fig. 1 is a parti-elevational and parti-vertical sectional view through a storage battery construction of the invention, such as taken along line I—I of Fig. 3;

Fig. 2 is a fragmentary sectional view taken along line II—II of Fig. 3;

Fig. 3 is a top plan view of a battery case cover of the invention;

Fig. 4 is a perspective view of a cover mounting component of the battery, shown in disassembled relation therefrom;

Fig. 5 is a perspective view of an auxiliary cover cap component of the battery construction, shown in disassembled relation therefrom; and Fig. 6 is a perspective view of a complete battery of the invention.

The invention contemplates broadly, provision of a mono-block case such as is readily moldable in a two-piece mold from any suitable plastic or rubber composition material or the like; the case having straight interior wall surfaces from top to bottom of the case thereby facilitating assemblage of the individual cell battery plate and separator sub-assemblies; in combination with a novel gutter inset device resting upon the top ledge portion of each cell of the case, and a novel smooth-surfaced one-piece cover adapted to cooperate with the inset devices and with the side and partition walls of the container to effect an improved sealed connection between the cover and the case. Furthermore, the cover member is recessed to accommodate in improved manner the cell-connecting bus bars of the battery in submerged relation within the cover structure.

To this end, the invention embodies a construction as illustrated for example in the drawing wherein the battery case is designated generally at 10 and is illustrated herein as being molded in mono-block form to comprise integral bottom and side wall portions 12, and end wall portions 14, and internal vertical partitions designated 16 which divide the battery case into a three-cell battery form in the example illustrated herein. In any case the interior side wall portions, as well as the partition wall portions of the case, are shaped so as to be vertically straight from top to bottom, whereby the plate and separator sub-assemblies may be readily slip-fitted downwardly into the battery cells as indicated at 18 in Fig. 1, while the case 10 is standing in upright position.

The terminal posts of each cell are of course dimensioned and shaped so as to protrude upwardly above the elevation of the top edge of the battery case; one of the end terminal posts shown in Figs. 1, 2, 3, being either the positive or negative end terminal post designated 20. The opposite terminal of the same cell is illustrated in Fig. 1 at 22, and is arranged to be connected by lead "burning" or welding at its upper end with a bus bar 24 which leads across and connects with the opposite polarity terminal of the center cell, as is well known in the art. The opposite terminal of the center cell, as indicated at 24 (Fig. 2), interconnects by means of bus bar 26 with the opposite polarity terminal of the other end cell as indicated at 28; and the other terminal of the last named end cell is extended through the cover of the battery case to protrude thereabove as indicated at 30 for cable attachment purposes as in the manner of the first mentioned terminal post 20.

It is a particular feature of the present invention that the cover member of the battery case construction is of novel configuration and assembled on the battery case in improved manner, as will now be explained in detail. As shown in Figs. 1, 2, 3 of the drawing, the cover element comprises a molded plastic or rubber composition member designated generally by the numeral 35; the top surface portion of the cover member being generally flat but formed with internally threaded filler openings integrally therewith as indicated at 36 centrally of each cell of the battery. Thus, the openings 36 accommodate screw-threaded plugs or caps as indicated in 38 (Fig. 6), as is well known in the art.

In the regions of the bus bars, 24, 26 the cover device 35 is recessed inwardly as indicated at 39 from the top surface thereof; the depressions 39—39 being suitably dimensioned in depth so as to accommodate the bus bars 24—26 in fully submerged relation therein while permitting cover caps 40—40 to be slip-fitted into the recesses on top of the bus bar and post connections, so that the cover caps 40—40 are disposed with their top surface flush with the top surface of the cover member 35. Spring flange portions 42—42 are formed integrally with the cover caps 40—40 at opposite side thereof, and are each set with a slight outward flare so as to be adapted to be sprung inwardly, thereby permitting them to be slip-fitted downwardly into the recesses 39—39 of the cover member, thereby forestalling accidental displacements of the cover caps 40—40 subsequent to assembly thereon.

The side and end and partition wall portions of the battery case are formed with square angled horizontal flanges or ledges as indicated at 46 (Fig. 2) whereby to accommodate in seated relations thereon, in the case of each cell, a gutter inset member designated generally by the numeral 50. As shown in more detail in Fig. 4, the seat members 50 each comprise an integrally molded unit consisting of a rectangular shaped vertical flange portion 52 subtended by a peripheral horizontal flange portion 54 which is shaped and dimensioned so as to sit on the ledges 46 at the upper ends of the battery cells, as shown in Figs. 1 and 2. Thus, the vertical flange portions 52 of the seat members are disposed in spaced relation from the adjacent inner vertical wall portions of the battery cells above the elevations of the horizontal ledges 46, thereby defining peripheral gutters around the top portion of each cell adapted to receive downwardly extending flange portions 56 of the battery cover 35. The gutter insets 50 may be conveniently formed of any suitably acid-resistant plastic or rubber composition or the like.

Some suitable cement as indicated at 58 is poured into the peripheral gutters into which the cover flanges 56 extend, thereby sealing the cover 35 to the battery case 10 throughout the top peripheral portion of each cell of the battery.

By virtue of the construction features of the battery case of the invention as described hereinabove, it will be apparent that the invention provides marked advantages with respect to fabrication of the component parts of the battery case and cover, as well as providing for a simplified assembly technique which greatly facilitates the overall battery assembly operations and reduces the expense thereof. For example, the battery case and cover components may obviously be readily fabricated by simple two-piece molding operations, as may be also the gutter inset members and the auxiliary cover cap members referred to hereinabove.

Thus, a storage battery of the invention may be readily assembled from the component parts by first slip-fitting into each cell of the battery case an appropriate complement of battery plate and separator units in previously sub-assembled form. The gutter devices 50 are then slip-fitted into positions on the ledges at the upper end of each cell, and cement is placed in the grooves so provided between the vertical flange portions of the seat members and the uppermost vertical wall portions of the case structure. The cover element 35 is then set in position in Figs. 1, 2 and pressed firmly down until it solidly seats upon the battery case as shown in the drawings. The bus bars 24—26 may then be readily "burned" or welded in position as shown in the drawing, and the cover caps 40 are then slipped into finally assembled positions thereon as shown in Figs. 1, 2, 3 and 6. Any suitable gasket devices as indicated at 60 may be employed in conjunction with the terminal posts of the battery plates as they pass upwardly through the cover member 35, as is well known in the art.

I claim:

1. A storage battery comprising a case having substantially straight and vertically standing wall and partition portions defining a plurality of battery cells, said wall portions being ledge-shaped at their upper ends, an angle-sectioned gutter member disposed to rest on said ledge portions at the upper end of each cell, thereby defining in cooperation with the upper terminal edges of the case walls a series of open gutters extending perimetrally of each cell, cement material disposed within said gutters, and a one-piece cover for the entire case having downwardly extending flanges disposed in said gutters and into cemented connection with said case walls.

2. A storage battery comprising a case defining a plurality of cells therein having vertically standing outside and partition wall portions, said wall portions being ledge-shaped at the upper ends thereof, an angle-sectioned inset member disposed to rest on said ledge portions at the upper end of each cell, thereby defining in cooperation with the upper edge portions of the case gutters extending perimetrally of the top of each cell, cement material disposed within said gutters, and a one-piece cover for the entire case having downwardly extending flange portions disposed in said gutters and into cemented connection with said case.

3. A storage battery comprising a case having substantially straight and vertically standing interior wall portions, said wall portions being ledge-shaped at the upper ends thereof, a gutter member disposed to rest on said ledge portions at the upper end of the case, thereby defining in cooperation with the upper edges of the case walls gutters running perimetrally of the case, cement material disposed within said gutters, and a one-piece cover for the entire case having downwardly extending flanges disposed in said gutters and into cemented connection with said case.

4. A storage battery comprising a case defining a plurality of cells terminating at the upper ends thereof in vertically standing wall portions, battery plate and separator units disposed within each of said cells and each having positive and negative terminals extending thereabove, said wall portions being ledge-shaped at the upper ends thereof, an angle-sectioned inset member disposed to rest on said ledge portions at the upper end of each cell thereby defining in cooperation with the upper edges of the cell walls gutters running perimetrally of the top end of each cell, cement material disposed within said gutters, a one-piece cover for the entire case having downwardly extending flange portions disposed in said gutters and into connection with said cement, said cover being perforated to permit the upper ends of the cell terminals to slip-fit and extend through said cover, said cover being recessed in line with the top ends of the opposite polarity terminals of adjacent cells, bus bars welded to and extending between said opposite polarity terminals while being submerged within said cover recessed portions, and flat-topped cap pieces press-fitted into said cover recessed portions to overlie said bus bars and to lie flush with the top surface of said cover member.

5. A storage battery comprising a case defining a cell therein having vertically standing wall portions, said wall portions being ledge-shaped at the upper ends thereof, an angle-sectioned inset member disposed to rest on said ledge portions at the upper end of the cell thereby defining in cooperation with the upper edges of the case walls a gutter running perimetrally of the cell, cement material disposed within said gutter, and a battery case cover having downwardly projecting flange portions extending into said gutter and into cemented connection with said case.

6. A storage battery case including a cell portion having substantially straight and vertically standing inside wall portions, said wall portions being ledge-shaped at their upper ends, a battery plate and separator unit disposed therein, an angle-sectioned gutter member disposed to rest on said ledge portions at the upper end of said cell, thereby defining in cooperation with the upper edges of the case walls an open gutter extending perimetrally of said cell, cement material disposed within said gutter, and a cover for said case having downwardly extending flanges disposed in said gutter and in cemented connection therewith.

7. A storage battery comprising a case defining a plurality of cells terminating at the upper ends thereof in vertically standing wall portions, battery plate and separator units disposed within each of said cells and each having positive and negative terminals extending thereabove, said wall portions being ledge-shaped at the upper ends thereof, an angle-sectioned inset member disposed to rest on said ledge portions at the upper end of each cell thereby defining in cooperation with the upper edges of the cell walls gutters running perimetrally of the top end of each cell, cement material disposed within said gutters, and a one-piece cover for the entire case having downwardly extending flange portions disposed in said gutters and into connection with said cement, said cover being perforated to permit the upper ends of the cell terminals to slip-fit through said cover, said cover being recessed in line with the top ends of the opposite polarity terminals of adjacent cells, bus bars welded to and extending between said opposite polarity terminals while being submerged within said cover recessed portions.

References Cited in the file of this patent

UNITED STATES PATENTS

| | | |
|---|---|---|
| 1,374,506 | Hunt | Apr. 12, 1921 |
| 1,540,252 | Chamberlain | June 2, 1925 |
| 1,703,735 | Holland | Feb. 26, 1929 |
| 1,823,448 | Hebbeler | Sept. 15, 1931 |
| 1,990,445 | Younkman | Feb. 5, 1935 |
| 2,657,249 | Kurth | Oct. 27, 1953 |